United States Patent Office 2,953,388
Patented Sept. 20, 1960

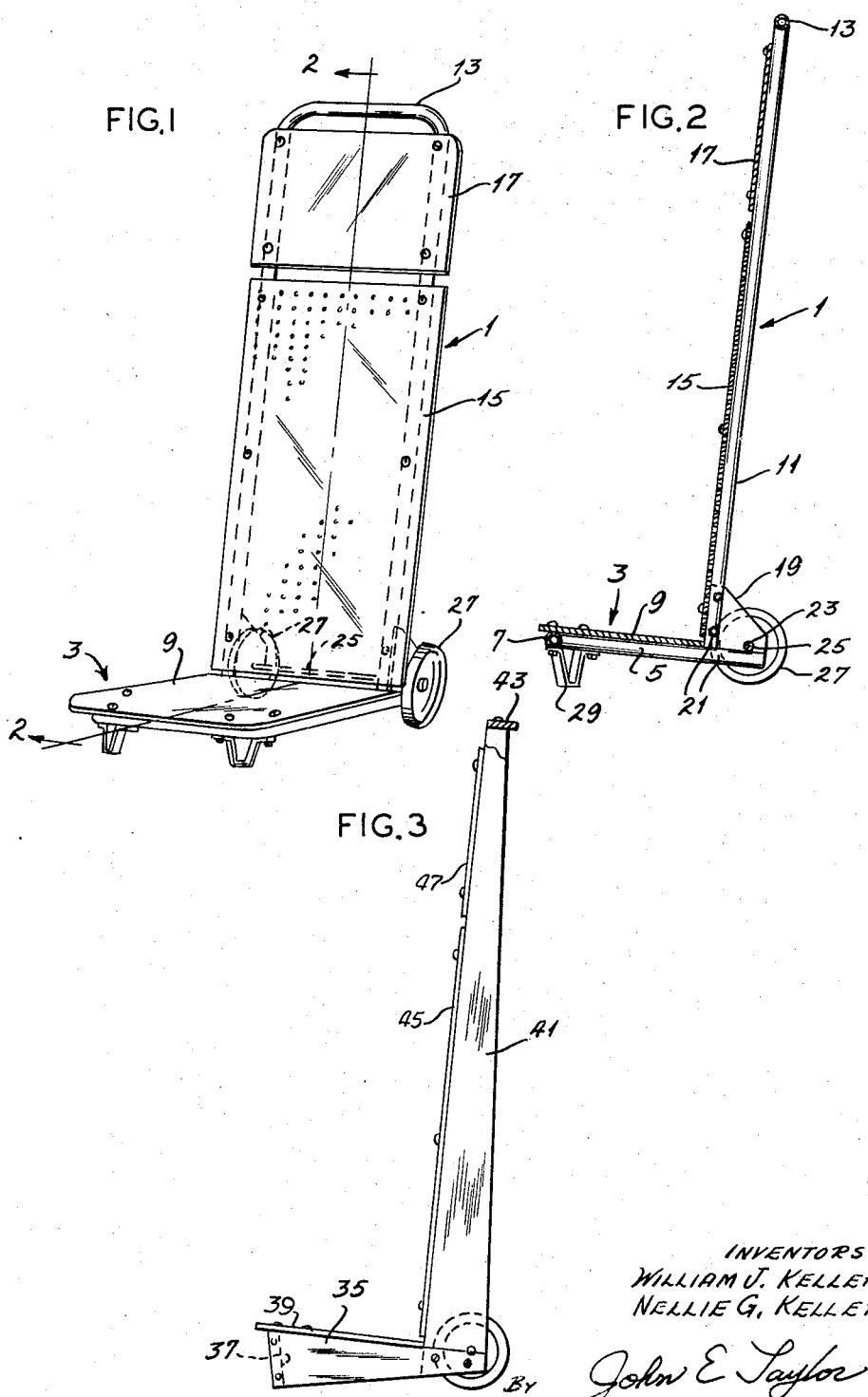

2,953,388
DISPLAY STAND

William Joshia Keller and Nellie Gertrude Keller, St. Louis, Mo., assignors to Keller Manufacturing Company, Inc., St. Louis, Mo., a corporation of Missouri Filed July 23, 1958, Ser. No. 750,480

1 Claim. (Cl. 280—47.24)

This invention relates to a cart adapted for display or storage of items, such as merchandise in a super-market.

In modern super-markets, much of the merchandise is arranged or carried on shelves, but some of the heavier or bulkier items may be arranged in a stack on the floor to form a compact display. It has been proposed that such merchandise might be more economically and conveniently handled by means of a display cart, which permits a stack of merchandise suitable for display in the selling area to be readily transported in its stacked condition from a receiving area. Such carts must have a pleasing appearance, considerable strength, low cost, and a small floor area, which requirements are not all readily available in conventional devices.

In accordance with the present invention, a display cart possessing the above attributes is manufactured by utilizing a base frame and a back frame formed of tubular metal or narrow wood supporting members, which extend along the sides of the base and the sides of the back, and to which fiberboard or plywood panels are secured. For example, the base frame may be formed by a short U-shaped member of tubular metal, and the back frame formed by a comparatively long U-shaped member.

The U-shaped frames are secured together in generally right angular relationship. For example, the ends of the base frame may extend beneath and somewhat beyond the ends of the back frame. Triangular plates bolted to the ends of the frames then hold them in proper relationship. These plates may also accommodate a shaft for a pair of wheels disposed generally beneath the back, whereas supporting feet may be provided at the front of the base frame to support the cart when at rest. A first rigid panel of fiberboard or plywood is fastened to the top of the base frame as a supporting platform for merchandise and as a reinforcing member for the frame. A second relatively long, rigid panel is fastened to the back frame so as to extend upward from the base a substantial distance. This relatively long panel provides reinforcement and also helps to hold items stacked upon the base. Preferably, the base is slightly inclined in the forward direction and the back is canted rearwardly a slight amount when the cart rests upon the front supporting feet. Finally, a display panel for advertising may be attached to the upper portion of the back above the lower panel thereon.

In an alternative embodiment, the base frame and the back frame are each made from narrow wood members, which are secured together in overlapping relationship, as by bolts, the overlapping portions thereof being adapted to accommodate a shaft for the wheels. In this embodiment, the wood frame-forming members for the base may taper rearwardly, and, in effect, form the front supporting feet.

The base platform is only a few inches above floor level, and extends only a foot or less in the forward direction from the lower panel on the back. The lower panel on the back frame might be about two feet long, and the back itself perhaps three or four feet in height, these dimensions being advantageous in providing a cart adapted to carry a considerable amount of merchandise in a small floor area. Also, such a cart has a considerable degree of stability when at rest, hence it might be used as a storage device for an item fastened to or carried on the front of the back. Of course, the cart is readily moved about by tilting the back.

Other features of the invention will be in part apparent from and in part pointed out in the following detailed description taken in connection with the accompanying drawings, in which:

Fig. 1 is a perspective view of a cart embodying features of the invention;

Fig. 2 is a vertical cross-section of the cart shown in Fig. 1; and

Fig. 3 is a view similar to that of view 2, but illustrating an alternative embodiment of the invention.

Referring to Figs. 1 and 2 of the drawings, the cart of this invention is shown to comprise a base generally designated 3 and a back generally designated 1. The base includes a frame formed by a length of tubular material bent into the shape of a U, so as to have side legs 5 and a cross-connecting bar 7. In accordance with this invention, a panel 9 of a rigid sheet material, such as plywood, fiberboard, or similar material, is secured to the U-shaped base frame, thereby providing a platform and also serving to reinforce the base frame.

The back 1 comprises a similar frame formed from a somewhat longer length of tubular material, which is bent into a somewhat longer U-shape so as to have side legs 11 and an upper cross-connecting bar 13. A relatively long panel 15 of rigid sheet material is secured over the lower portion of the back frame, and this sheet may be perforated as illustrated. The second panel 15 terminates short of the upper cross bar 13, and a third panel 17 may be fastened to the upper portion of the back frame, as illustrated. The upper panel may serve as a display surface for advertising material.

The legs 5 of the base frame extend in generally right angular relationship to the legs 11 of the back frame, and the ends of the base frame project beneath and somewhat beyond the ends of the back frame, as shown. The two frames are then secured together with generally triangular plates 19, as by bolts 21. The triangular plates connect with the rearwardly projecting end portions of the base frame and the lower end portions of the back frame, and the plates 19 have holes 23 for receiving a shaft 25. Wheels 27 are then secured to the shaft 25, the wheels being disposed generally beneath the back of the cart and rearwardly of the base. Supporting feet 29 are formed at the front of the base, these supporting feet being in the form of rigid straps secured across the corners of the base frame. The supporting feet 29 and wheels 27 are arranged so that the base is normally supported at a slight incline in the forward direction, the back then being canted rearwardly a slight amount. This arrangement is desirable from the viewpoint of supporting a relatively high stack of merchandise by both the base panel and the lower panel of the back.

Referring now to Fig. 3, a similar cart is formed by utilizing narrow wood members in forming the base frame and back frame. In this instance, the base frame includes a pair of rearwardly tapering side members 35 and a front member 37 secured across the side members 35. The back frame comprises a pair of narrow upwardly tapering strips 41, which are secured to the base side members 35, and upon cross-connecting member 43 bridges the side members 41 of the back frame. The rearwardly tapering shape of the base frame is advantageous in that the members 35 may thereby function as front supporting feet for the base. Panels 39, 45 and 47 are secured to the base and back frames, as described in connection with the other embodiment.

It will be understood that merchandise may be stacked to a considerable height on the base platform of the cart, and while so stacked, may be moved about. The cart with merchandise stacked thereon forms an attractive display, yet permits movement thereof, as from a shipping or receiving area to the sales or display area. Necessarily, the cart is moved by grasping the top of the back and tilting it rearwardly. At rest, the front of the base engages the floor, hence the cart has a high degree of stability. It should be noted, however, that an item might be carried from the back of the cart, rather than on the base, as by a bracket attached to the back.

Preferably, the base extends only a short distance forwardly, for example, less than a foot, the back being from three to four feet in height, and the lower panel thereof being about two feet in height. All of the panels preferably are formed of a fibrous material, such as plywood or pressed fiberboard, of substantial thickness as distinguished from sheet metal or wire. Thin metal panels are disadvantageous because they tend to be excessively flexible and permit distortion or bending of the base or back, particularly when carrying heavy loads. Also, there is a problem in covering or shaping the edges of a metal panel so that they will not be dangerous. These difficulties are avoided by using a panel of fibrous material as described above.

From the above it will be apparent that those skilled in the art will understand the structure, function and mode of operation of the invention herein disclosed, and appreciate the advantages thereof. Although several embodiments have been disclosed in detail, it is to be understood that the invention is not limited to these embodiments, but rather the drawings and detailed descriptions are to be taken merely as illustrative. Various modifications will present themselves to those skilled in the art without departing from the spirit of this invention or the scope thereof as set forth in the appended claim.

Having thus described the invention, what is claimed and desired to be secured by Letters Patent is:

A cart of the character set forth comprising an elongate generally vertical back and a relatively short generally horizontal base, said base comprising a frame formed from a length of tubular metal bent to a generally U-shape, the base frame having narrow relatively straight frame members extending along its opposite sides, a rigid panel of fibrous material secured over the front upper portion of said base frame as a supporting platform and reinforcing member of the said base frame, said back comprising a frame formed from a length of tubular metal bent to a generally U-shape, the back frame having narrow relatively straight frame members extending along opposite sides of the back from the back ends of the base frame members, a second relatively elongate rigid panel of fibrous material secured between the lower front portion of the said back frame members and to said back frame at several spaced points therealong to extend upwardly from said base panel a distance substantially greater than the forward dimensions of the base panel and width of the back panel as a support and reinforcing member for the back frame, said back frame being several times longer than said base frame, the ends of the base frame extending rearwardly beneath and beyond the ends of the back frame, vertical plate-like members secured by bolts in knock-down relationship to the ends of the base frame and the back frame members, said plate members securing the two frames in generally right-angular relationship and also accommodating a shaft extending above the rearwardly projecting ends of the base frame through said plates, wheels secured to the ends of said shaft, and supporting feet formed at the front of the base frame.

References Cited in the file of this patent

UNITED STATES PATENTS

| | | |
|---|---|---|
| 1,578,602 | Heath | Mar. 30, 1926 |
| 1,722,193 | Brandon | July 23, 1929 |
| 2,059,965 | Joncha | Nov. 3, 1936 |
| 2,318,231 | Katzman | May 4, 1943 |

FOREIGN PATENTS

| | | |
|---|---|---|
| 501,362 | Italy | Nov. 24, 1954 |